Figure 3:
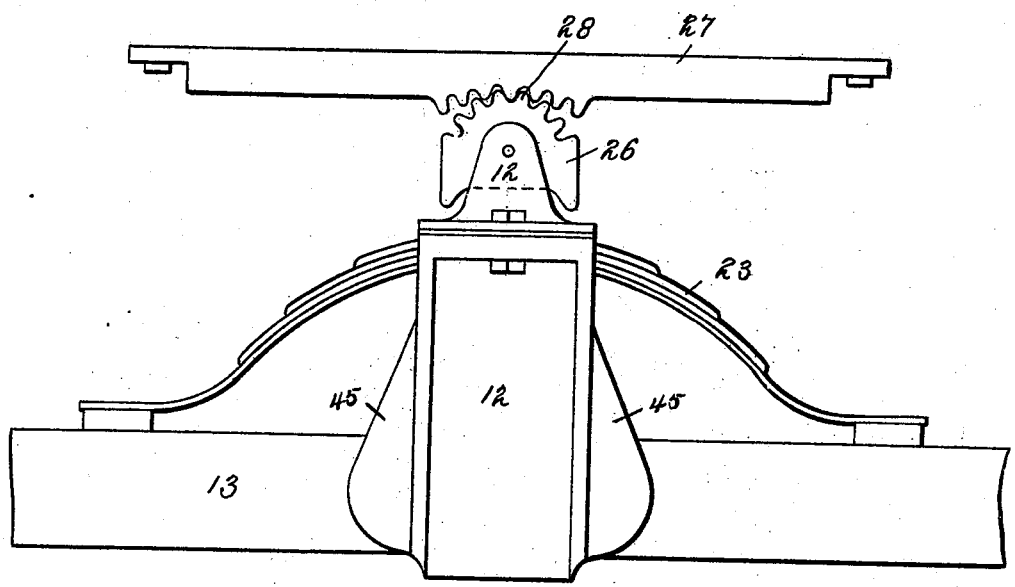

No. 620,136. Patented Feb. 28, 1899.
M. G. HUBBARD, Jr.
ADJUSTABLE TRACTION MOTOR TRUCK.
(Application filed June 17, 1895.)
(No Model.) 3 Sheets—Sheet 1.
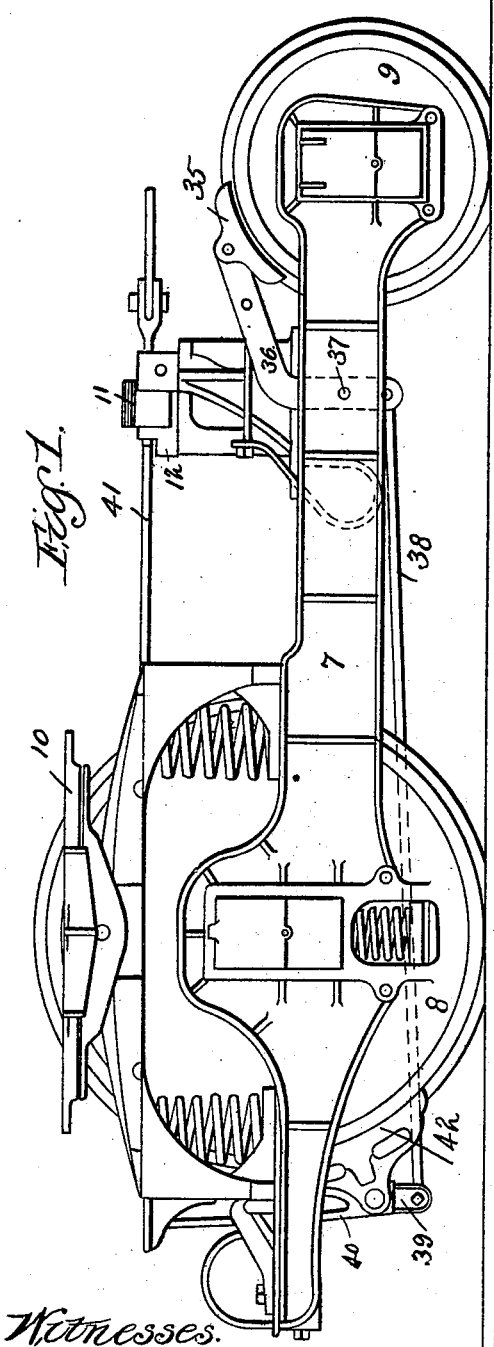
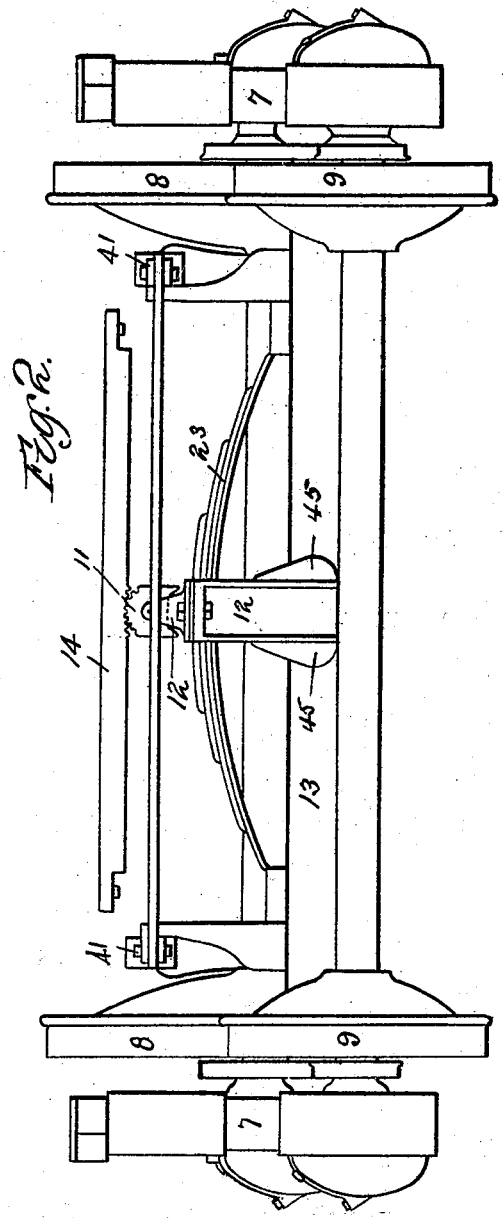
Witnesses.
Inventor
Moses G. Hubbard Jr.

No. 620,136. Patented Feb. 28, 1899.
M. G. HUBBARD, Jr.
ADJUSTABLE TRACTION MOTOR TRUCK.
(Application filed June 17, 1895.)

(No Model.) 3 Sheets—Sheet 2.

Witnesses. Inventor.

No. 620,136.   M. G. HUBBARD, Jr.   Patented Feb. 28, 1899.
ADJUSTABLE TRACTION MOTOR TRUCK.
(Application filed June 17, 1895.)

(No Model.)   3 Sheets—Sheet 3.

Witnesses.   Inventor.

UNITED STATES PATENT OFFICE.

MOSES G. HUBBARD, JR., OF CHICAGO, ILLINOIS, ASSIGNOR TO THE McGUIRE MANUFACTURING COMPANY, OF SAME PLACE.

ADJUSTABLE TRACTION-MOTOR TRUCK.

SPECIFICATION forming part of Letters Patent No. 620,136, dated February 28, 1899.

Application filed June 17, 1895. Serial No. 553,084. (No model.)

*To all whom it may concern:*

Be it known that I, MOSES G. HUBBARD, Jr., a citizen of the United States, residing in Chicago, in the county of Cook and State of Illinois, have invented certain new and useful Improvements in Adjustable Traction-Motor Trucks, of which the following is a specification, reference being had to the accompanying drawings, in which—

Figure 1 is a side elevation. Fig. 2 is an end elevation. Figs. 3, 4, 5, and 6 are views showing various kinds of devices for compressing the springs and shifting the load from the drive-wheels to the guide-wheels when rounding curves.

My invention relates to improvements in adjustable traction-motor trucks or trucks having drive-wheels and guide-wheels and provided with means for shifting part of the load from the drive-wheels to the guide-wheels when rounding curves, which form of truck has been patented to me by Letters Patent of the United States, dated December 18, 1894, No. 531,208.

My invention consists in improved mechanism for compressing the springs for shifting the load from the drive-wheels to the guide-wheels on curves.

It further consists of an improved bearing for the shifting-springs when the car is on a straight track.

It further consists of an improved brake-rigging for trucks of this description, all of which will be hereinafter described.

In the drawings, 7 indicates the truck-frame, 8 the drive-wheels, and 9 the guide-wheels.

Figure 5:
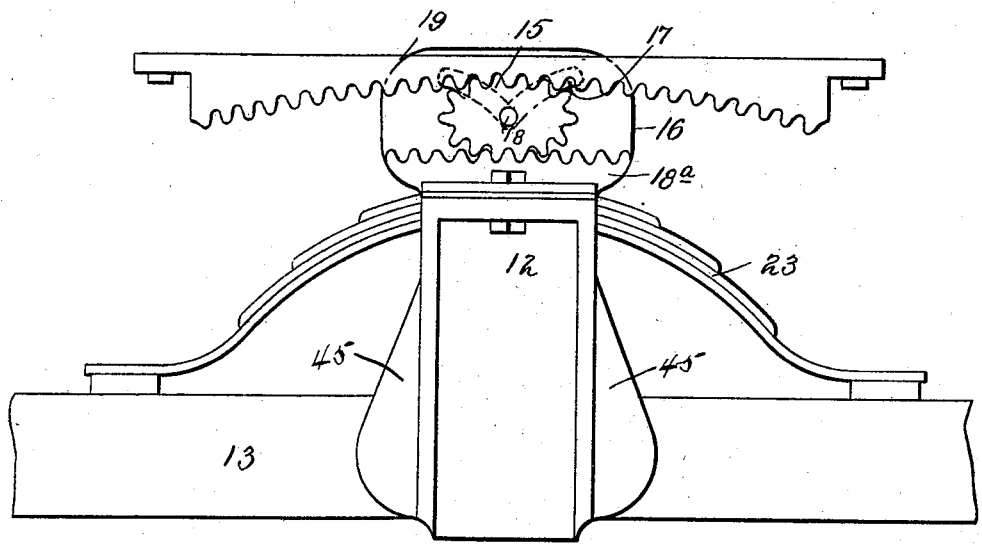
Figure 6:
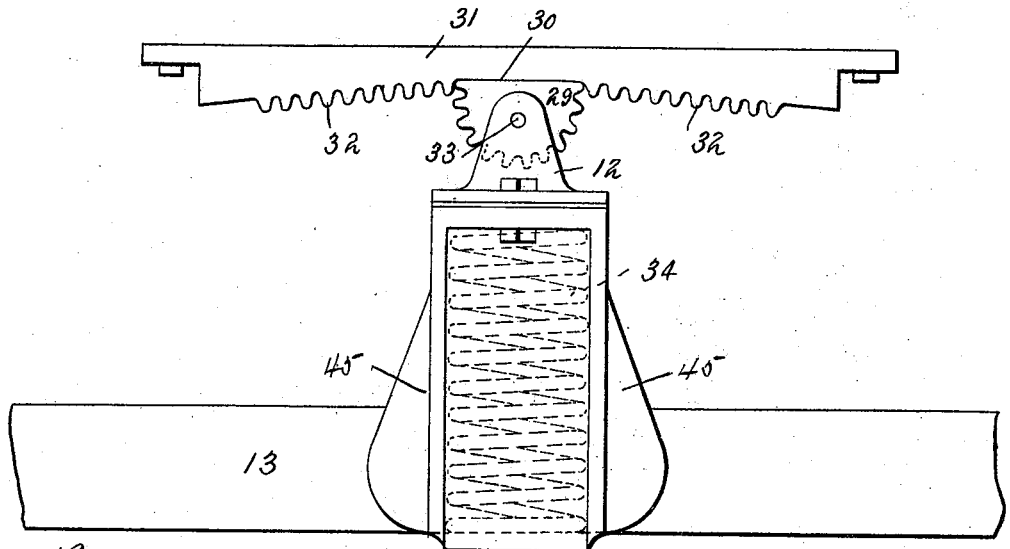

The car-body is supported upon the truck over the drive-wheels by a frame 10, as shown in Fig. 1, so that all or the greater part of the load is carried upon the drive-wheels on a straight track, as is fully described in my patent above referred to.

Where very little load is to be carried on the idle or guide wheels on a straight track, for the purpose of distributing the load I use either an eccentric roller or a roller having part of its periphery cut away, as shown in Fig. 2, 11 indicating the roller, which is mounted upon a suitable support 12, carried upon a cross-bar 13, connected to the truck-frame near the guide-wheels, as shown in Fig. 1, a spring 23 being interposed between the support 12 and the bar 13 for the purpose of holding said support in its upper or normal position. The roller 11 engages a bar 14, secured to the under side of the car. As shown in Fig. 2, the shape of the roller 11 is such that the distance across the center of the end of said roller is greater at one part than at the opposite part, so that as it rotates or rolls on a flat surface its center is alternately raised and depressed. Across part of the face of this roller 11 are formed gear-teeth, and on the bar 14, which it engages, are formed corresponding teeth, so that when the roller 11 is rolled by the action of the trucks under the car-body it will be positively and surely returned to its original position. When a considerable portion of the load is to be carried on the guide-wheels, however, an elliptical roller having no fixed pivot may be used, as shown in Fig. 5, where 15 indicates the roller, which is mounted upon the support 12, which carries guide-plates 16, having slots 17 to receive the pivot-pin 18, carried by the roller 15. The plates 16 are bolted to the support or pedestal 12, which is mounted upon either the elliptic spring 23 or the spiral spring 34, as illustrated in the drawings, said elliptic or spiral spring being supported upon the bars 13, as shown in Figs. 5 and 6. 45 indicates guides or pedestals which are mounted upon and attached to the bars 13, as shown in Fig. 2. The support 12 works up and down therein. The support 12 also has a rack-bar $18^a$, which is engaged by the roller 15. By this construction instead of a flat bar 14, attached to the car-body, a concave bar 19 is used with which the roller 15 meshes.

Figure 4:
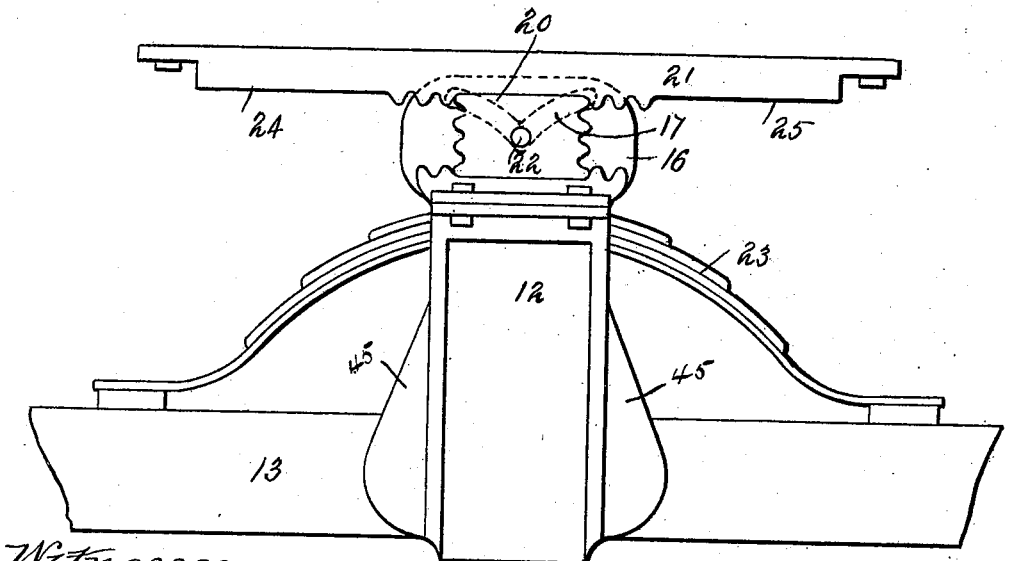

In Fig. 4 I have shown another construction which for many reasons I prefer to use when a considerable portion of the load is to be carried on the guide-wheels. In this construction a roller 20 is used, which is substantially circular, but cut away on two opposite sides, one flat side having a bearing on the support 12, the opposite flat side having a bearing on a bar 21, secured to the car-body. The bar 21 is provided with teeth to mesh with teeth in the periphery of the roller 20. The roller 20 is mounted upon a pivot-pin 22, which runs in the slots 17. This construction gives a flat bearing of large area in proportion to the load to be sustained above and below and can be made to give any desired increase of load on the guide-wheels on curves by simply correspondingly changing the proportions of the rollers. Furthermore, if desired, the bar 21, upon which the roller travels, may be made concave or substantially concave, as shown in Figs. 5 and 6, to increase the action of the spring 23 by the travel of said roller upon it. The plates 16 serve to retain the rollers in place; but if such rollers should from any extraordinary travel caused by an accident, such as the car's leaving the track, require to move more than half a turn flat surfaces 24 25 are provided at each side of the central portion of the bar 21, on which flat surfaces the flat surfaces of the roller 20 can slide as far as may be necessary. When the rollers 20 are slid back again, they again engage the teeth of the bar 21 and return to their normal position. This feature is also shown in the constructions illustrated in Figs. 2 and 3. In Fig. 3 a construction in many respects similar to that shown in Fig. 4 is illustrated, the roller being somewhat differently shaped. In said figure, 26 indicates the roller, which has at opposite sides thereof flat surfaces arranged to slide upon the flat surfaces of a bar 27, attached to the car-body. Between the flat surfaces of the roller 26 is a cam portion 28, which is provided with teeth and meshes with the concave portion of the bar 27. By this construction the application of the load to the guide-wheels is more gradual than in the construction shown in Fig. 4.

In Fig. 6 a roller 29 is shown, which acts in very much the same way as the roller 20 shown in Fig. 4. Said roller 29 is provided with an upper flat surface 30, resting upon a flat portion of a bar 31, secured to the car-body. At each side of the bar 31 are inclined racks 32, adapted to mesh with the lower curved portion of the roller 29. The roller 29 is mounted on a fixed pivot 33. Instead of a semi-elliptic spring 23 I have shown in this figure a coil-spring 34, which acts in very much the same way. When a spiral spring 34 is used, a pocket is formed in the guide 45 to receive its lower end, as indicated in Fig. 6.

When little or no load is carried on the guide-wheels, the brakes bearing only on the driving-wheels are sufficient; but when any considerable proportion of the load is to be carried on the guide-wheels it is necessary to have brakes on them as well as on the drive-wheels, said brakes being so constructed that the brake-pressure on the guide-wheels will be in proportion to the load carried by them.

In trucks for street-car service it is very desirable that there be no projections beyond the guide-wheels, as any such projections are liable to interfere with the steps on open cars when rounding curves. I have therefore designed a brake for this type of truck which will be free from this objection, which brake is illustrated in Fig. 1.

35 indicates a brake-shoe, one of which is provided for each guide-wheel above the truck-frame 7, said shoes being supported on levers 36, pivoted at 37 to the truck-frame, the shape of such levers being such that the shoes lie over the upper portions of the wheels. The other ends of the levers 36 are connected by connecting-rods 38 to the short ends 39 of the usual brake-levers 40, operated by the usual brake apparatus 41. The levers 36 and the brake-levers 40 are so proportioned as to give the desired relative proportion of brake-pressure upon the two sets of wheels. The brake-shoes 42 of the drive-wheels being hung on the outside of the wheel-base of the truck and the shoes 35 of the guide-wheels being hung inside of the wheel-base of the truck and being connected as above described, a pull upon the long end of the actuating-lever 40 toward the center of the car would press all of the shoes against their respective wheels with a pressure corresponding to the relative proportions of the aforesaid levers, and, such levers being proportioned to correspond to the proportion of load the trucks are arranged to carry upon the two pairs of wheels, the per cent. of load and brake-pressure correspond, thereby securing the greatest brake efficiency.

It is obvious that instead of supporting the springs 23 upon the truck-frame and the bar 14 to the car-body the arrangement may be reversed.

That which I claim as my invention, and desire to secure by Letters Patent, is—

1. In an adjustable traction-truck having two pairs of wheels and arranged to carry a greater proportion of the load on one of said pairs of wheels on a straight track and to shift part of the load onto the other pair of wheels on curves, the combination with a pair of brake-shoes hung outside the wheel-base at the heavy end of the truck, and a pair of brake-shoes hung inside the wheel-base at the lighter end of said truck, of levers for the said inside-hung shoes, each of said levers having its long end connected with one of said shoes, actuating brake-levers having their fulcrums connected with the outside brake-shoes on the heavy end of the truck, the longer arms of said levers being connected with the source of power, and connecting-rods between the short ends of the respective brake-levers, whereby the brake-pressure may be proportioned to the load carried on the respective pairs of wheels, substantially as described.

2. In a motor-car truck, provided with drive-wheels and guide-wheels, arranged to carry the greater part of the load upon the drive-wheels on a straight track and to shift part of the load upon the guide-wheels on curves, the combination of mutilated pinions, racks interposed between said truck and car-body, and springs arranged to be depressed by the rotation of said pinions from the movement of the truck under the car-body on curves, whereby the proportion of the load upon the wheels and axles is varied, substantially as described.

3. In an adjustable traction-truck having drive-wheels and guide-wheels, the combination of springs interposed between the truck and car-body near the guide-wheels of said truck, a roller having its pivotal center nearer its outer rim on one side thereof and a bearing for said roller for actuating said spring and increasing the load on said guide-wheels on curves, substantially as described.

4. In an adjustable traction-truck having drive-wheels and guide-wheels, the combination of springs interposed between the truck and car-body near the guide-wheels of said truck, a roller having its pivotal center nearer its outer rim on one side thereof and having teeth formed on part of said outer rim, and a corresponding bearing for said roller, whereby said springs are actuated to increase the load on the guide-wheels by the movement of the truck under the car-body on curves, substantially as described.

5. In an adjustable traction-truck having drive and guide wheels, the combination with springs interposed between said truck and car-body near the guide-wheels of said truck, a toothed roller the contour of which is an imperfect circle, suitable bearings for said roller interposed between said springs and car-body, whereby said springs are actuated and the load on the guide-wheels is increased on curves by the movement of the truck under the car-body, substantially as described.

MOSES G. HUBBARD, JR.

Witnesses:
ALBERT H. ADAMS,
HOLMES A. TILDEN.